Feb. 11, 1930.   B. G. KUHNE ET AL   1,746,267
MOLD MANIPULATING METHOD AND APPARATUS
Original Filed Sept. 21, 1927   5 Sheets-Sheet 1
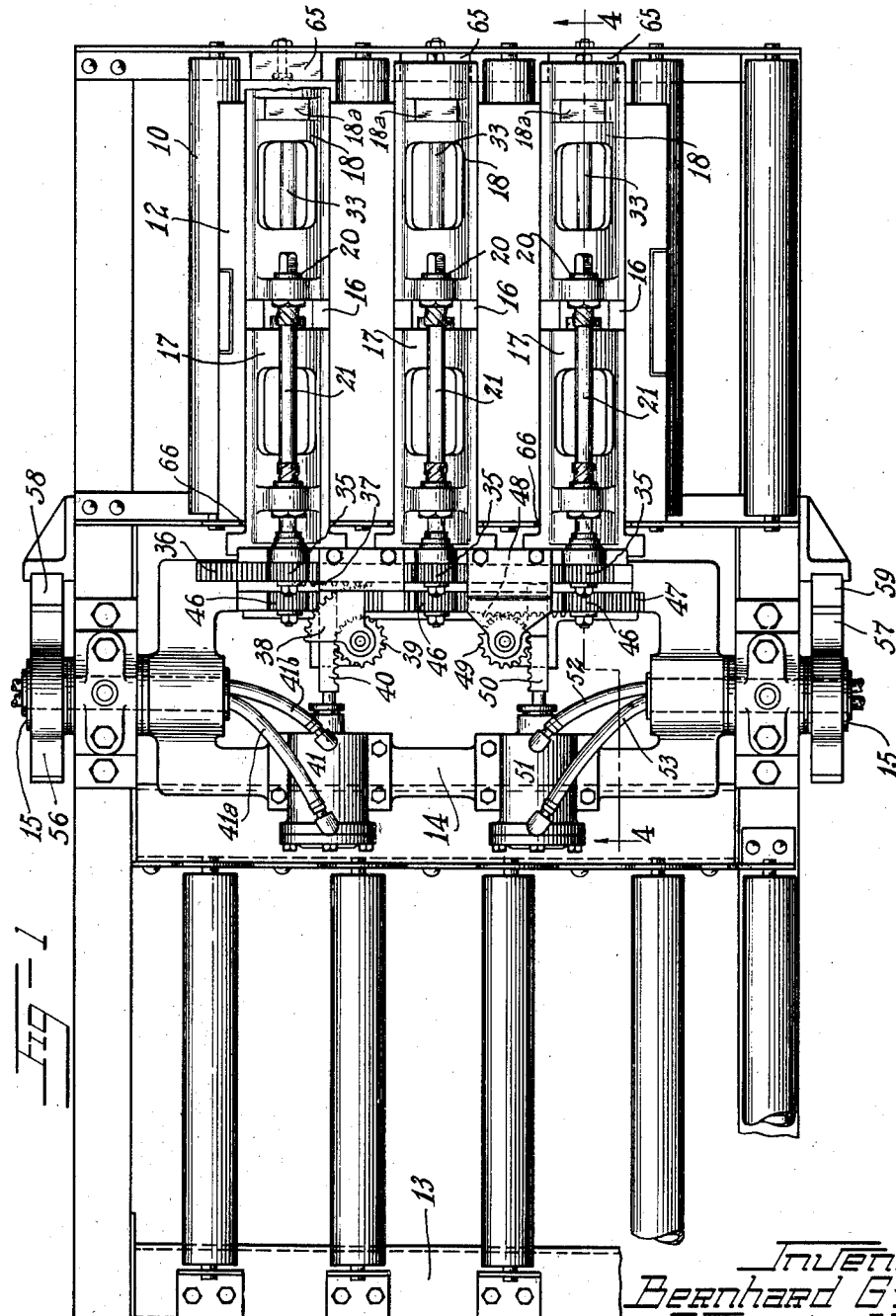
INVENTORS
Bernhard G. Kuhne
Hugo Haiss
By Pierson, Eakin & Avery
Attys-

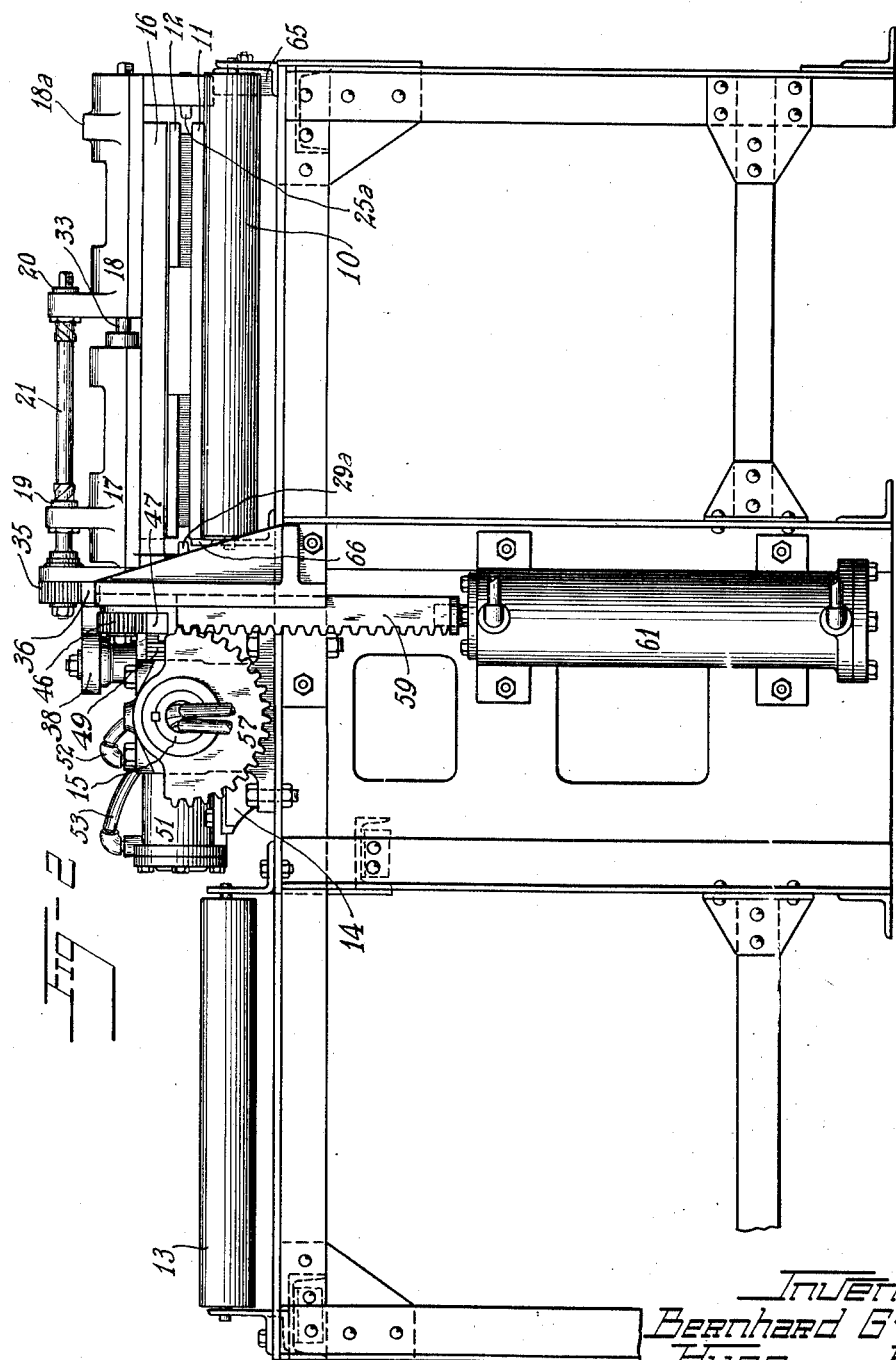

Feb. 11, 1930. B. G. KUHNE ET AL 1,746,267
MOLD MANIPULATING METHOD AND APPARATUS
Original Filed Sept. 21, 1927   5 Sheets-Sheet 3
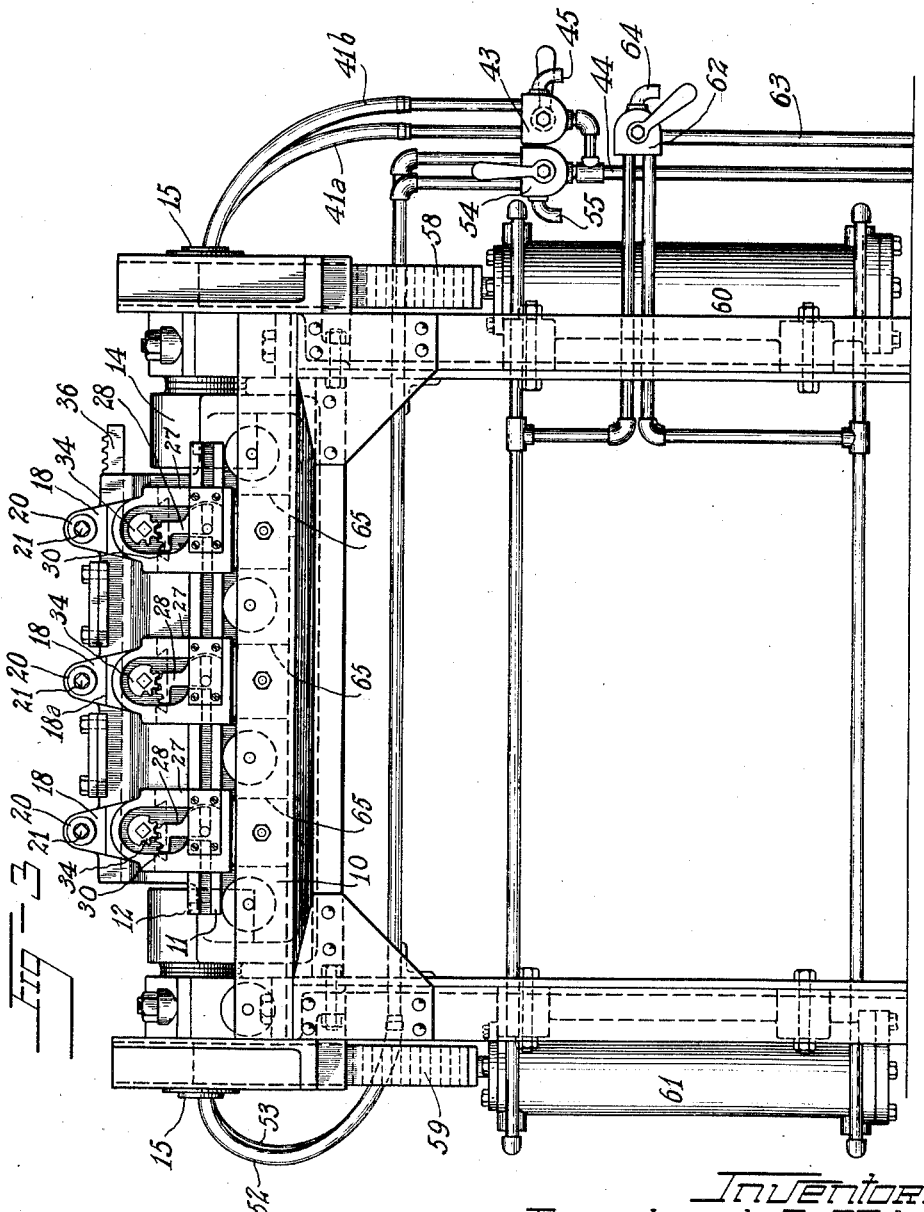
Inventors
Bernhard G. Kuhne
Hugo Haiss
By Pierson, Eakin & Avery
Attys.

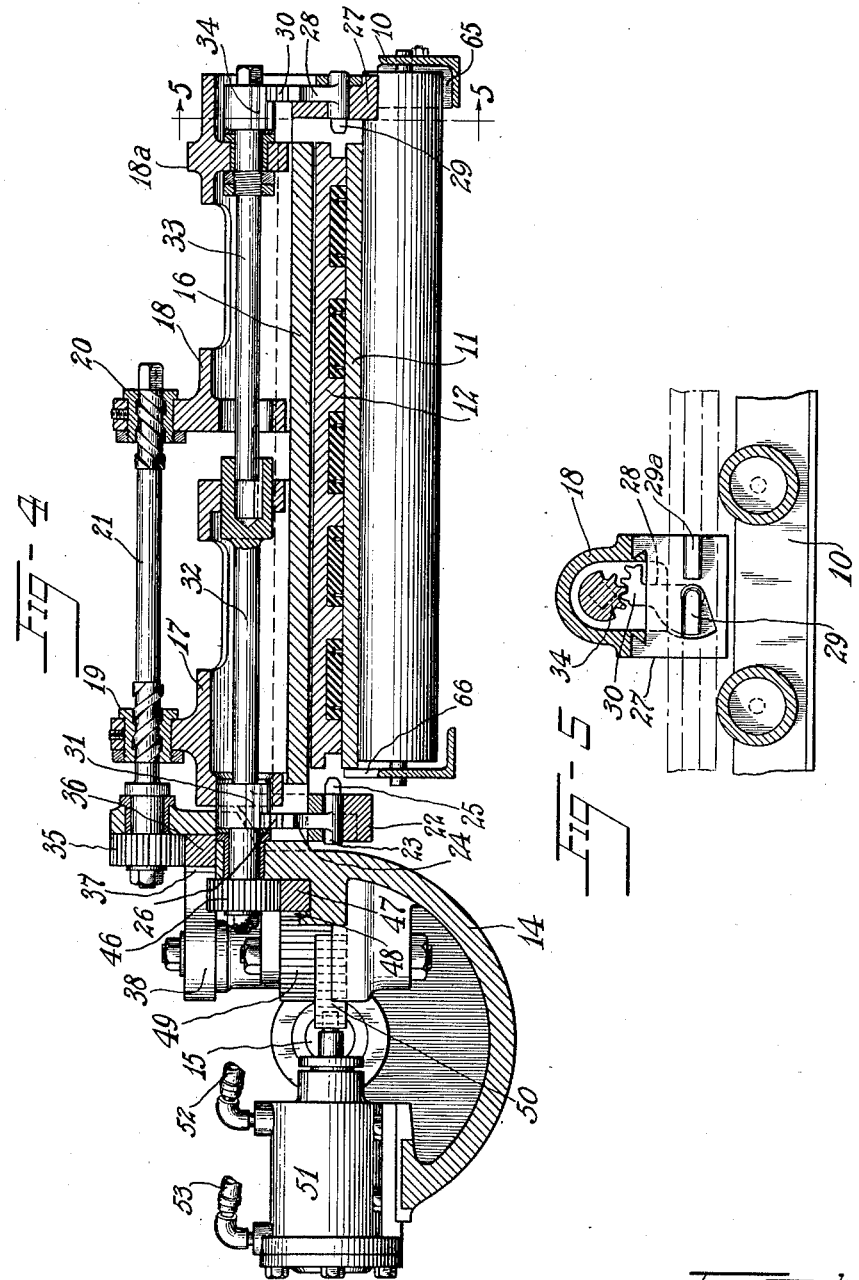

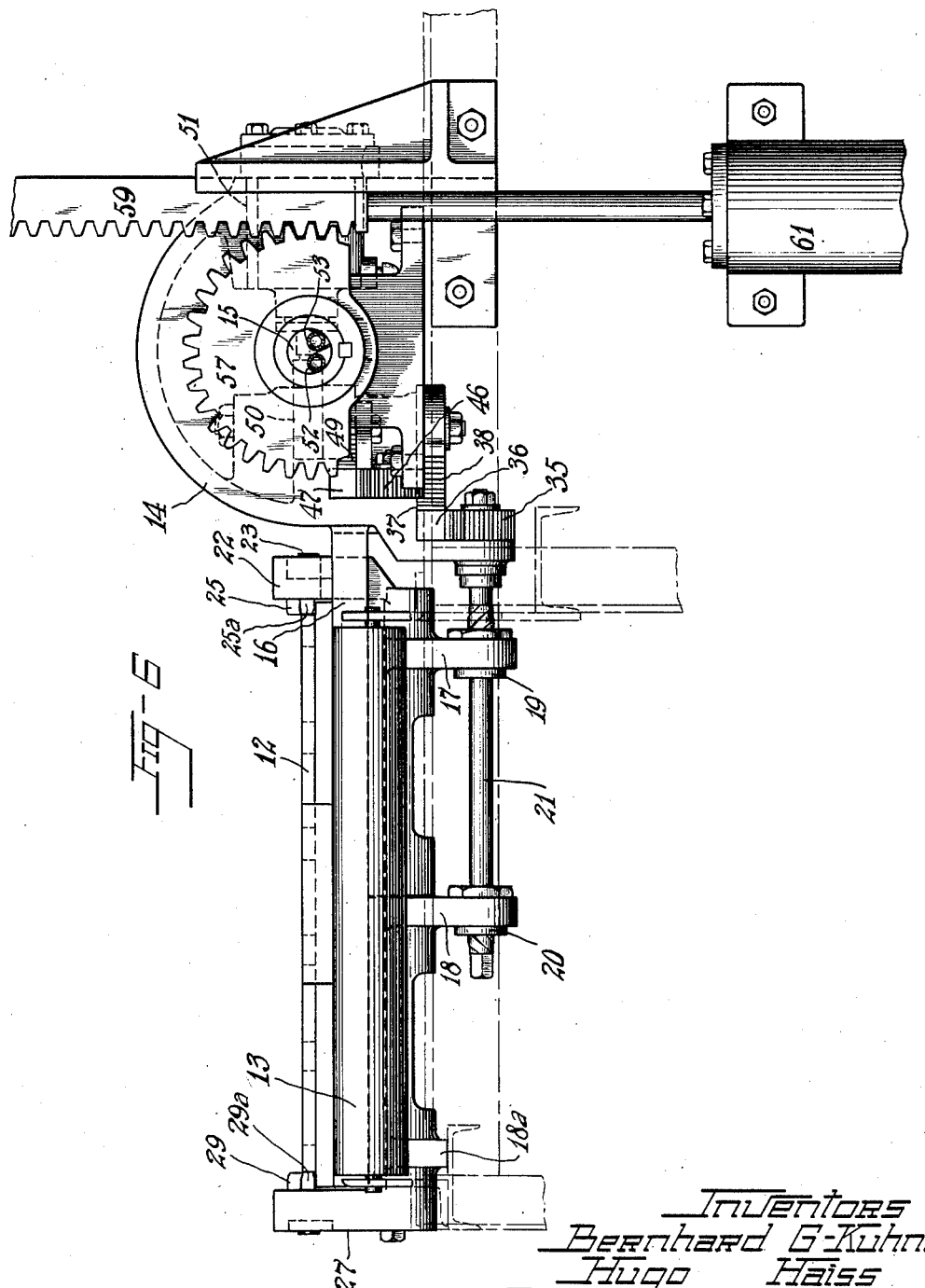

Patented Feb. 11, 1930

1,746,267

UNITED STATES PATENT OFFICE

BERNHARD G. KUHNE AND HUGO HAISS, OF AKRON, OHIO, ASSIGNORS TO THE B. F. GOODRICH COMPANY, OF NEW YORK, N. Y., A CORPORATION OF NEW YORK

MOLD-MANIPULATING METHOD AND APPARATUS

Application filed September 21, 1927, Serial No. 220,907. Renewed July 3, 1929.

This invention relates to procedure and apparatus for manipulating the sections of a sectional mold such as is commonly used for the molding and vulcanizing of rubber articles such as rubber heels for shoes, for example, the present invention being an improvement upon that of copending application Serial No. 208,563, of Bernhard G. Kuhne, filed July 26, 1927.

The chief objects of the present invention are to provide improved procedure and apparatus for opening a sectional mold; to provide for largely automatic operation in separating the mold sections and conveying them along respective determinate paths; to avoid the discomfort to workmen of handling mold sections that are hot from the vulcanizing operation; and to provide other advantages such as are usually sought in power-operated machinery.

Of the accompanying drawings:

Fig. 1 is a plan view of apparatus embodying and adapted to carry out my invention in its preferred form, with the parts in position for initiating the opening of the mold.

Fig. 2 is an elevation of the same.

Fig. 3 is an elevation of the same from the right of Fig. 2.

Fig. 4 is a section on line 4—4 of Fig. 1.

Fig. 5 is a section on line 5—5 of Fig. 4.

Fig. 6 is an elevation of parts of the apparatus, from the same viewpoint as Fig. 2, with the parts in position for depositing on a conveyor a mold section that has been lifted from a mating section and swung over to an inverted position.

Referring to the drawings, the apparatus comprises a support, here shown as a roll-type conveyor 10, for a rubber-heel mold comprising a lower section 11 and an upper section 12; a support, here shown as a roll-type conveyor 13, adapted to receive the upper mold section 12 as the latter is lifted from the lower section 11 and turned over to a horizontal, inverted position; and a mold-opening and turning device for prying the two mold sections apart upon the conveyor 10 and turning the upper mold section 12 over onto the conveyor 13.

The mold-opening and turning device comprises a frame casting 14 provided with hollow trunnions by which it is pivoted in the framing of the conveyors, between them, at 15, 15, the casting being integrally formed with a plurality of parallel arms 16, 16 extending at right-angles to its pivotal axis. Each arm 16 has dovetailed thereon, in its face which is uppermost in the mold-cracking position, a pair of slides 17, 18 provided with respective apertured brackets in each of which is mounted a threaded bushing, 19 or 20. The bushing 19 of the slide 17 is formed with a right-hand thread and the bushing 20 of the slide 18 is formed with a left-hand thread and mounted in the two bushings and in the casting 14 is a screw-shaft 21 formed with complemental threads meshed with those of the bushings, the shaft thus being adapted, by rotation, to move the two slides 17 and 18 from and toward each other.

Each of the slides 17 is formed with an open-center bracket 22 adapted to extend to a position adjacent the side of the mold sections 11, 12 as shown clearly in Fig. 4, the mold being positioned against stops 66, 66, and pivoted in the outer end portion of the bracket at 23 is a mold-cracking lever 24 having a mold-cracking arm or lug 25 formed on the inner end of its pivot portion and adapted to be inserted between the spaced-apart margins of the mold sections 11, 12 by movement of the slide 17 toward the mold.

An arm of the mold-cracking lever 24 extending into the central space of the bracket 22 is formed at its end with a gear-segment 26 for turning the lever to crack the mold by turning of the lug 25. A stationary lug 25$^a$ is formed on the bracket 22 in alignment with the lug 25 when the latter is in normal position, the lug 25$^a$ assisting in supporting the mold section 12 during the mold-turning operation.

Each of the slides 18 is formed with an open-center bracket 27 similar to the brackets 22 of the slides 17 and provided with a stationary lug 29$^a$, and a mold-cracking lever 28 having a mold-cracking lug 29 and a gear segment 30.

Meshed with each of the gear segments 26 is a segmental gear 31 secured upon a shaft 32 which is slidably journaled in the slide 17 and non-slidably journaled in the casting 14 (see Fig. 4) and is formed at its outer end with an axially apertured head in which is slidably keyed the adjacent end of a shaft 33 which is journaled in the adjacent slide 18 and is provided with a segmental gear 34 meshed with the gear segment 30 of the adjacent mold-cracking lever 28, the telescoped relation of the shafts 32 and 33 permitting them to operate as a single extensible shaft while permitting the slides 17 and 18 to be moved toward each other for inserting the lugs 25, 25ª, 29, 29ª between the mold sections and to be moved away from each other so that the said lugs will clear the upper mold section.

For moving the series of slides 17 and the series of slides 18 from and toward each other, each of the reversely threaded shafts 21 is provided with a pinion 35 and the several pinions 35 are meshed with a single rack 36 which is slidably mounted on the casting 14 and is formed with a second set of teeth 37 (see Fig. 1) which are meshed with a gear-segment 38 mounted on the casting 14 and having a pinion 39 secured on its shaft and meshed with a rack 40 mounted in extension of the piston rod of a double-acting fluid-pressure cylinder 41 which is mounted upon the casting 14 and provided with flexible supply-and-exhaust pipes 41ª, 41ᵇ extending through the adjacent hollow trunnion of the casting and having connection, through a four-way valve 43 (Fig. 3), with a compressed-air supply pipe 44 and an exhaust pipe 45.

For turning the mold-cracking levers 24, 28 each of the shafts 32 has secured thereon a pinion 46 and the several pinions 46 are meshed with a single rack 47 which is slidably mounted on the casting 14 and is formed with a second set of teeth 48 (see Fig. 1) which are meshed with a pinion 49 mounted on the casting 14 and also having meshed therewith a rack 50 mounted in extension of the piston rod of a double-acting fluid-pressure cylinder 51 which is mounted upon the casting 14 and provided with flexible supply-and-exhaust pipes 52, 53 which extend through the adjacent hollow trunnion of the casting and have connection, through a four-way valve 54 (Fig. 3) with the compressed air pipe 44 and an exhaust pipe 55.

For turning the casting 14 and the parts carried thereby the trunnions of the casting have secured thereon respective gear-segments 56, 57 which are meshed with respective racks 58, 59 which are mounted in extension of the piston-rods of a pair of vertical, double-acting hydraulic cylinders 60, 61 which are connected for simultaneous action, through a four-way valve 62 (Fig. 3), with a water-supply pipe 63 and an exhaust pipe 64.

The several assemblies which are mounted upon the respective arms 16 of the casting 14 are so spaced with relation to the rolls of the conveyor 10 and those of the conveyor 13 as to permit parts thereof to pass between the rolls, as will be clearly understood upon reference to Figs. 3 and 6, so as to operate upon the mold to crack it open while the mold rests upon the conveyor 10 and so as to deposit upon the conveyor 13 the upper mold section 12 when the latter and the casting 14 carrying it are swung over to the positions in which they are shown in Fig. 6.

Mounted upon the frame of the conveyor 10 at its outer side, between the rolls thereof, are abutment-pads 65, 65 upon which the brackets 27 of the respective arms 16 of the casting 14 are adapted to rest and thus hold the latter in horizontal position and slightly above the mold on said conveyor. When the casting 14 is so positioned, the mold-cracking lugs 25, 29 are in position to be inserted between the margins of the mold sections, so that the mold sections may be slightly separated by the turning of the lugs with but slight angular movement of the casting 14.

Each of the slides 18 is formed with a rectangular boss 18ª which rests upon the frame of the conveyor 13 between the rolls thereof at the completion of the mold-turning operation, said bosses being of such height that the upper faces of the arms 16 are positioned slightly below the tops of the rolls of said conveyor, so that the mold member rests upon said rolls and readily may be propelled thereon.

In the operation of the apparatus, a mold 11, 12 with vulcanized articles therein is placed in opening position upon the conveyor 10, permissibly by shoving it thereonto, in a direction parallel to the conveyor rolls, against the stops 66, from another conveyor leading from the vulcanizer, while the mold opening devices are in the positions, adjacent the conveyor 13, in which they are shown in Fig. 6.

The hydraulic cylinders 60, 61 are then actuated, by means of the valve 62, to turn the mold-opening devices over to the positions in which they are shown in Fig. 4, the slides 17, 18 being held apart by the cylinder 41 and the lugs 25, 29 being held parallel with the mold sections 11, 12 by the cylinder 51.

The cylinder 41 is then reversed by means of the valve 43, which moves the slides of each pair 17, 18 toward each other and thus causes the lugs 25, 25ª, 29, 29ª to enter between the margins of the mold sections.

The cylinder 51 is then reversed, by means of the valve 54, which turns the lugs 25 and 29 and cause them to crack or initiate the opening of the mold and lifts the uper mold section 12 and holds it against the arms 16 of the casting 14.

The hydraulic cylinders 60, 61 are then reversed, by means of the valve 62, which causes the casting 14 to rotate through approximately 180 degrees and come to rest with the mold section 12, inverted, bearing upon the rolls of the conveyor 13 and with the arms 16 and parts carried thereby lying between the rolls.

The cylinders 51 and 41 are then reversed in succession, to turn the lugs 25, 29 back into parallelism with and thus to release the mold section, and to spread apart the slides 17, 18, so that the mold section 12 may be freely moved away, on the conveyor 13, from the members by which it has been engaged. Upon the swinging over of the mold section 12, the section 11 is left upon the conveyor 10 and may be freely moved away thereon.

The two mold sections are thus disposed of, and the operation as described is repeated upon successive molds.

Our invention is susceptible of modification within the scope of the appended claims.

We claim:

1. The method of manipulating sections of a sectional mold which comprises moving the mold in closed condition to a determinate mold-opening position, prying one section from another and turning it away therefrom to an isolated position by a determinate, over-turning movement while securing the second-named section against such movement.

2. Mold-manipulating apparatus comprising grasping and releasing means for forcing one section of a sectional mold from another and means cooperatively associated therewith for turning the first mentioned section away from the other section in a determinate, over-turning movement.

3. Mold-manipulating apparatus comprising an over-swinging frame and power means mounted on said frame for initiating the opening movement of a sectional mold and for anchoring one of the sections to the frame.

4. Mold-manipulating apparatus comprising a support for a sectional mold, an over-swing frame, a slide mounted thereon, a mold-cracking member mounted on said slide and adapted to be inserted between the sections of a mold on said support by movement of the slide on the frame, and power means mounted on the frame for so moving the slide and for actuating the mold-cracking member.

5. Mold-manipulating apparatus comprising an over-swinging frame, means thereon for grasping a mold-section, and additional means thereon for initiating a separating movement between a mold-section grasped thereby and another section associated therewith.

6. Mold-manipulating apparatus comprising a support for a sectional mold, a carrier movably mounted for moving away from said support one section of a sectional mold mounted thereon, and a mold-cracking device mounted on said carrier.

7. Mold-manipulating apparatus comprising a support for a sectional mold, a second support adapted to receive a mold-section, an over-swinging frame pivoted between the two supports, and means wholly on said frame for initiating an opening movement of two mold sections on the first support by crowding them apart and for holding one of the sections in fixed position with relation to the frame.

8. A mold-manipulating apparatus comprising spaced apart supporting members for a mold section, an over-swinging frame having parts adapted to pass downward between the said members in over-swinging movement of the frame, and means on said parts for holding a mold section thereon in position to come to rest on said supporting members when the said parts pass downward between said members.

In witness whereof we have hereunto set our hands this 15th day of September, 1927.

BERNHARD G. KUHNE.
HUGO HAISS.